United States Patent
Nagai

(10) Patent No.: US 8,132,605 B2
(45) Date of Patent: Mar. 13, 2012

(54) PNEUMATIC TIRE WITH TREAD INCLUDING BLOCK HAVING SIPES

(75) Inventor: Kunihiko Nagai, Osaka (JP)

(73) Assignee: Toyo Tire & Rubber Co., Ltd., Osaka (JP)

(\*) Notice: Subject to any disclaimer, the term of this patent is extended or adjusted under 35 U.S.C. 154(b) by 617 days.

(21) Appl. No.: 12/332,455

(22) Filed: Dec. 11, 2008

(65) Prior Publication Data

US 2009/0178743 A1   Jul. 16, 2009

(30) Foreign Application Priority Data

Jan. 15, 2008   (JP) ................. 2008-005880

(51) Int. Cl.
*B60C 1/00* (2006.01)
*B60C 11/00* (2006.01)
*B60C 11/12* (2006.01)

(52) U.S. Cl. .......... 152/209.5; 152/209.17; 152/DIG. 3; 152/902

(58) Field of Classification Search .......... 152/209.5, 152/209.17, 209.18, 209.23, DIG. 3, 902
See application file for complete search history.

(56) References Cited

U.S. PATENT DOCUMENTS

| | | | | |
|---|---|---|---|---|
| 4,619,300 A | * | 10/1986 | Tokunaga et al. | .......... 152/209.5 |
| 2009/0178744 A1 | * | 7/2009 | Nagai | .......... 152/209.5 |

FOREIGN PATENT DOCUMENTS

| | | | | |
|---|---|---|---|---|
| JP | 63-219404 | A | * | 9/1988 |
| JP | 02-041802 | U | * | 3/1990 |
| JP | 07-237409 | A | * | 9/1995 |
| JP | 06-164817 | A | * | 6/1997 |
| JP | 10-315711 | A | * | 12/1998 |
| JP | 2000-158915 | | | 6/2000 |
| JP | 3110783 | B2 | * | 11/2000 |
| JP | 2001-121926 | | | 5/2001 |
| JP | 2002321509 | A | | 11/2002 |
| JP | 2004-42773 | | | 2/2004 |
| JP | 2004-098737 | A | * | 4/2004 |
| JP | 2006076323 | A | | 3/2006 |

OTHER PUBLICATIONS

Machine translation for Japan 10-315711 (no date).*
Machine translation for Japan 07-237409 (no date).*
Machine translation for Japan 3110783 (no date).*
machine translation for Japan 09-164817 (no date).*
Machine translation for Japan 2004-098737 (no date).*
Chinese Office Action for Application No. 200910001534.5 dated Jun. 8, 2010, 3 pages.
German Office Action for Application No. 10 2009 004 477.9-16, dated Aug. 19, 2010, 5 pages.

\* cited by examiner

*Primary Examiner* — Steven D Maki
(74) *Attorney, Agent, or Firm* — Fish & Richardson P.C.

(57) ABSTRACT

A pneumatic tire has an upper surface sipe formed on an upper surface of the block, a first wall surface sipe formed in a first wall surface of the block and extending in a direction intersecting the upper surface sipe, and a second wall surface sipe formed in a second wall surface which is adjacent to the first wall surface, and extending in a direction intersecting the upper surface sipe and the first wall surface sipe.

6 Claims, 3 Drawing Sheets

PNEUMATIC TIRE WITH TREAD INCLUDING BLOCK HAVING SIPES

BACKGROUND OF THE INVENTION

1. Field of the Invention

The present invention relates to a pneumatic tire provided with a block in a tread surface, and is particularly useful as a studless tire.

2. Description of the Related Art

Conventionally, in the studless tire, a cut called as a sipe is formed in a block of a tread surface, and a traveling performance on an iced road surface having a low coefficient of friction is enhanced based on an edge effect and a drainage effect generated by the sipe. As the sipe mentioned above, a linear sipe and a waveform sipe are put to practical use, the linear sipe extending linearly along a longitudinal direction, and the waveform sipe extending like a wavy form or a zigzag form.

The inventor of the present invention pays attention to a fact that a motion of the block is great on the iced road surface, and a ground contact pressure within the block tends to be uneven due to the motion, for further enhancing the traveling performance on the iced road surface. Further, as a result of repeatedly making a study, it is found that a region in which the ground contact pressure becomes particularly high exists in the vicinity of a wall surface of the block, thereby enhancing the unevenness of the ground contact pressure and deteriorating the traveling performance on the iced road surface. A description will be given below of a knowledge relating to the ground contact pressure distribution mentioned above.

FIG. 8 shows a ground contact pressure distribution within a block at a time of applying a braking force to a tire on an iced road surface, and an arrow R shows a turning direction of the tire. In accordance with this drawing, it is known that the ground contact pressure is high in a region close to a wall surface 21 forming a front side in the turning direction, thereby forming a factor enhancing an unevenness of the ground contact pressure within the block 20. Further, the region having the high ground contact pressure exists near wall surfaces 22 and 23, and in the case that a lateral force generated by a turning travel motion is applied, the ground contact pressure in this region becomes further higher. In this case, at a time of applying a driving force to the tire, an upside down tendency to FIG. 8 is generated, and the ground contact pressure becomes higher in the region close to a wall surface 24 of the block 20.

Here, in Japanese Unexamined Patent Publication No. 2004-42773, there is described a tire in which a narrow groove extending in a tire diametrical direction is formed on a wall surface around a block. However, the tire is provided for removing a water film generated between the wall surface of the block and a snow ice, and does not suggest means for solving the unevenness of the ground contact pressure within the block mentioned above. Further, since the sipe on the upper surface and the narrow groove on the wall surface are in parallel to each other, in this tire, there is a problem that a rigidity of the block is locally and extremely lowered too much and a steering stability performance is deteriorated, at a position where they are arranged within the same plane.

Further, in Japanese Unexamined Patent Publication No. 2001-121926, there is described a tire in which a step portion is integrally provided around a block, and a sipe extending in a tire diametrical direction is formed in a side wall of the step portion. However, the tire is provided for bringing the sipe formed in the side wall of the step portion into sight on the tread surface so as to enhance an edge effect, for securing a snow traction performance after medium and end stages of a wear, and does not suggest means for solving the unevenness of the ground contact pressure within the block. Since a rigidity of a peripheral portion of the block is improved by the step portion, the ground contact pressure in the region close to the wall surface tends to come up, and there is a risk of promoting the unevenness of the ground contact pressure within the block.

Further, in Japanese Unexamined Patent Publication No. 2000-158915, there is described a tire in which a wall surface of a block is provided with a plurality of reinforcing ribs extending approximately in parallel to a tread surface and protruding into a groove. However, the tire is provided for suppressing a lift of the block from the road surface caused by a bending deformation, and does not suggest means for solving the unevenness of the ground contact pressure within the block mentioned above. Japanese Unexamined Patent Publication No. 2000-158915 defines that the rigidity with respect to a shearing direction which are in parallel to the road surface and a compressing direction is not changed by forming the wall surface of the block as an accordion shape by the reinforcing rib.

SUMMARY OF THE INVENTION

The present invention is made by taking the above actual condition into consideration, and an object of the present invention is to provide a pneumatic tire which can uniformize a ground contact pressure within a block so as to enhance a traveling performance on an iced road surface, without locally lowering too much a rigidity of the block.

The object can be achieved by the present invention having the following structure. That is, the present invention provides a pneumatic tire provided with a block in a tread surface, comprising an upper surface sipe formed on an upper surface of the block, a first wall surface sipe formed in a first wall surface of the block and extending in a direction intersecting the upper surface sipe, and a second wall surface sipe formed in a second wall surface which is adjacent to the first wall surface, and extending in a direction intersecting the upper surface sipe and the first wall surface sipe.

In the pneumatic tire in accordance with the present invention, since the sipe is formed on the wall surface of the block, it is possible to lower the rigidity of the region close to the wall surface. Accordingly, it is possible to uniformize the ground contact pressure within the block by dispersing the pressure in the region in which the ground contact pressure tends to be particularly high. Further, since the upper surface sipe, the first wall surface sipe and the second wall surface sipe extend in the directions intersecting each other, they are not arranged within the same plane, and it is possible to prevent the rigidity of the block from locally lowering too much. As mentioned above, in accordance with the present invention, it is possible to uniformize the ground contact pressure within the block so as to enhance the traveling performance on the iced road surface without locally lowering too much the rigidity of the block.

In the above structure, it is preferable that the first wall surface sipe and the second wall surface sipe are terminated within the wall surface without being open to a ridge line of the block. Accordingly, it is possible to prevent the rigidity from lowering too much in the ridge line portion of the block, and it is possible to preferably secure the steering stability performance or the like. In this case, the ridge line of the block includes a ridge line between the upper surface of the block and each of the wall surfaces, and a ridge line between the wall surfaces of the blocks.

In the above structure, it is preferable that the upper surface sipe is constituted by a closed sipe. In accordance with the structure mentioned above, since it is possible to secure the length of the wall surface sipe in the wall surface positioned in the longitudinal direction of the upper surface sipe, it is possible to easily lower the rigidity of the region close to the wall surface.

In the above structure, it is preferable that the block is provided with an upper layer portion arranged in an upper surface side, and a lower layer portion made of a harder rubber than the upper layer portion and arranged in an inner side in the tire diametrical direction of the upper layer portion, and the number of at least one of the first wall surface sipe and the second wall surface sipe is made more in the lower layer portion than the upper layer portion. In accordance with the structure mentioned above, it is possible to make the rigidity balance between the upper layer portion and the lower layer portion of the block favorable so as to enhance the uniformity of the ground contact pressure within the block, while lowering the ground contact pressure in the region in which the ground contact pressure tends to become particularly high.

In the above structure, it is preferable that the block is provided with an upper layer portion arranged in an upper surface side, and a lower layer portion made of a harder rubber than the upper layer portion and arranged in an inner side in the tire diametrical direction of the upper layer portion, and the at least one of the first wall surface sipe and the second wall surface sipe is formed by a waveform sipe and the wave number of the wall surface sipe is set more in the lower layer portion than the upper layer portion. In accordance with the structure mentioned above, it is possible to make the rigidity balance between the upper layer portion and the lower layer portion of the block favorable so as to enhance the uniformity of the ground contact pressure within the block, while lowering the ground contact pressure in the region in which the ground contact pressure tends to become particularly high.

DETAILED DESCRIPTION OF THE PREFERRED EMBODIMENTS

Figure 1:
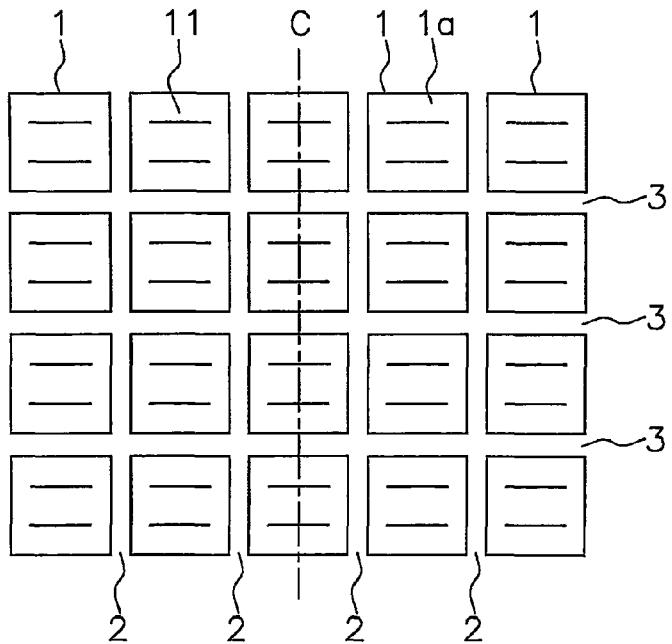
FIG. 1 is an expansion plan view showing an example of a tread surface of the pneumatic tire of the invention.

An embodiment of the present invention will be explained with reference to the drawings. FIG. 1 is an expansion plan view showing an example of a tread surface of the pneumatic tire of the invention. The pneumatic tire is provided with a tread pattern having a plurality of blocks 1. The block 1 is sectionalized by a main groove 2 extending in a tire circumferential direction and a lateral groove 3 extending in a tire width direction, and five rows of blocks 1 are arranged symmetrically with regard to a tire equator line C.

A plurality of (two in the present embodiment) upper surface sipes 11 having a linear opening portion are arranged in parallel in an upper surface 1a of each of the blocks 1 so as to be spaced at a predetermined interval. The upper surface sipe 11 is not open to the main groove 2, and is formed as a both-side closed sipe in which both ends are terminated within the upper surface 1a. In order to sufficiently generate an edge effect and a drainage effect, it is preferable that a sipe width of the upper surface sipe 11 is between 0.3 and 0.6 mm, and it is preferable that a sipe depth is between 30 and 80% of a depth of the main groove 2.

Figure 2:
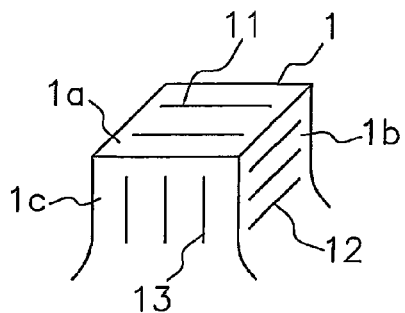
FIG. 2 is a perspective view of the block.
Figure 3:
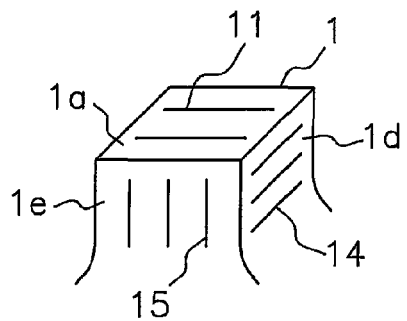
FIG. 3 is a perspective view of the block.

FIG. 2 is a perspective view of the block 1 as seen from a lower right direction in FIG. 1, and FIG. 3 is a perspective view of the block 1 as seen from an upper left direction in FIG. 1. The block 1 in accordance with the present embodiment is formed as a rectangular parallelepiped shape having a rectangular upper surface 1a, a wall surface 1b (corresponding to the first wall surface) and a wall surface 1d positioned in the longitudinal direction of the upper surface sipe 11 and facing to the main groove 2, and a wall surface 1c (corresponding to the second wall surface) and a wall surface 1e positioned in the sipe width direction of the upper surface sipe 11 and facing to the lateral groove 3.

In the wall surface 1b, there is formed a wall surface sipe 12 (corresponding to the first wall surface sipe) extending approximately in parallel to the upper surface 1a. In the present embodiment, three wall surface sipes 12 having a linear opening portion are arranged in parallel to the tire diametrical direction so as to be spaced at a predetermined interval. The wall surface 1b is positioned in the longitudinal direction of the upper surface sipe 11, and the wall surface sipe 12 extending approximately in parallel to the upper surface 1a extends in a direction intersecting the upper surface sipe 11.

In the wall surface 1c, there is formed a wall surface sipe 13 (corresponding to the second wall surface sipe) extending in the tire diametrical direction. The wall surface 1c is adjacent to the wall surface 1b in the intersecting direction, and the wall surface sipe 13 extends in the direction intersecting the upper surface sipe 11 and the wall surface sipe 12.

A ground contact pressure in a region near the wall surface 1b and the wall surface 1d of the block 1 tends to become high on the iced road surface, however, since the wall surface sipes 12 and 13 is formed, it is possible to uniformize the ground contact pressure within the block 1 by lowering a rigidity of the region near the wall surface 1b and the wall surface 1c. Further, since the upper surface sipe 11, the wall surface sipe 12 and the wall surface sipe 13 extend in the direction intersecting each other, they are not arranged within the same plane, and it is possible to prevent the rigidity of the block 1 from locally lowering too much.

Figure 4:
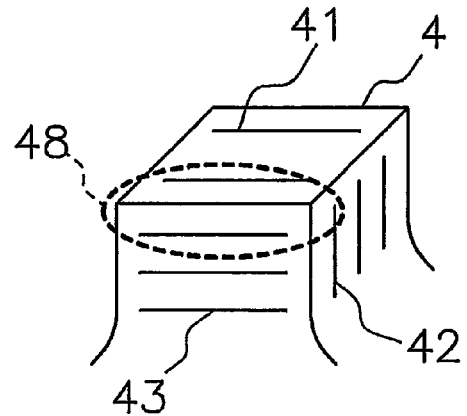
FIG. 4 is a perspective view of a block shown for comparing with the present invention.

On the contrary, the following problem is generated in the block 4 as shown in FIG. 4. In this block 4, the wall surface sipe 42 extends in parallel to the upper surface sipe 41, and they are arranged within the same plane. In addition, the wall surface sipe 43 also extends in parallel to the upper surface sipe 41. Accordingly, in a region surrounded by a broken line frame 48, a portion comparted by the upper surface sipe 41, the wall surface sipe 42 and the wall surface sipe 43 behaves as a small block, and the rigidity of the block 4 locally and extremely lowers too much, thereby generating a problem such that the steering stability performance is deteriorated.

The block 1 is formed in such a manner that the upper surface sipe 11, the wall surface sipe 12 and the wall surface sipe 13 do not interfere with each other. In other words, the sipe depth of the wall surface sipe 12 is shorter than the distance from the wall surface 1b to the upper surface sipe 11, and the sipe depth of the wall surface sipe 13 is shorter than the distance from the wall surface 1c to the surface sipe 11. In accordance with the structure mentioned above, it is possible to effectively prevent the rigidity of the block 1 from locally lowering too much, and it is possible to preferably secure the steering stability performance.

The sipe widths of the wall surface sipes 12 and 13 are not particularly limited as far as it can lower the rigidity of the region near the wall surfaces 1b and 1c, and is exemplified by 0.3 to 0.6 mm, however, the wall surface sipes 12 and 13 may be formed as a notch shape at the sipe width between 1.0 and 2.0 mm. Further, the sipe depths of the wall surface sipes 12 and 13 are exemplified by 0.5 to 1.5 mm, however, are preferable so as to be prevented from being interfered with the upper surface sipe 11 as mentioned above.

In the present embodiment, the wall surface sipes 12 and 13 are terminated within the wall surfaces 1b and 1c respectively without being open to a ridge line of the block 1. In the present invention, the wall surface sipes 12 and 13 may be open to the ridge line of the block 1, however, it is possible to prevent the rigidity of the ridge line portion of the block 1 from locally lowering too much by forming the wall surface sipe as the closed sipe as mentioned above, and it is possible to preferably secure the steering stability performance or the like.

The wall surface sipe 14 formed in the wall surface 1d and the wall surface sipe 15 formed in the wall surface 1e are respectively formed similarly in the wall surface sipe 12 and the wall surface sipe 13, and they correspond to the first wall surface sipe and the second wall surface sipe. Around the block 1, the respective wall surface sipes extend in the direction intersecting with each other in the adjacent wall surfaces, and all the wall surface sipes 12 to 15 extend in the direction intersecting the upper surface sipe 11. Accordingly, it is possible to disperse the pressure in the region close to each of the wall surfaces 1b to 1e, and it is possible to effectively uniformize the ground contact pressure within the block 1.

In the present embodiment, all of the upper surface sipe 11, the wall surface sipe 12 and the wall surface sipe 13 are formed as the linear sipe, however, in the present invention, a part or a whole of them can be formed as a waveform sipe. In the case where the upper surface sipe 11 is constituted by the waveform sipe, an opening portion of the upper surface sipe 11 is hard to become narrow, whereby it is possible to improve the edge effect and the drainage effect. Further, it is sufficient that at least one each wall surface sipes 12 and 13 is formed, however, it is preferable that a plurality of wall surface sipes are formed for securely lowering the rigidity of the region near the wall surface.

The present invention is not limited to the structure in which the wall surface sipes extend in the orthogonal direction such as the present embodiment, as far as the wall surface sipes extend in the direction intersecting the upper surface sipe. For example, in the wall surface sipes 12 and 14, there is exemplified a structure which is inclined at an angle of ±30 degrees with respect to the upper surface 1a of the block 1, and in the wall surface sipes 13 and 15, there is exemplified a structure which is inclined at an angle of ±30 degrees with respect to the tire diametrical direction. The angle of the sipe is determined with reference to a center line passing through the center of the vibration amplitude in the case where the wall surface sipe is constituted by the waveform sipe.

The interval between the wall surface sipes 12 and the interval between the wall surface sipes 13 are not particularly limited as far as they lower properly the rigidity of the region close to the wall surfaces 1b and 1c, however, it is preferable that they are between 0.5 and 4.5 mm, and it is more preferable that they are between 1.0 and 2.0 mm. If they are less than 0.5 mm, an arrangement of the wall surface sipes becomes overpopulated, and the rigidity of a whole of the block is lowered. Accordingly, there is a tendency that the traveling performance on the iced road surface is lowered. Further, a metal mold manufacturing work becomes hard, and a foreign particle tends to clog at a time of the vulcanization molding, so that there is a risk that a possibility of deteriorating the tire appearance becomes high. On the other hand, if they exceed 4.5 mm, it is hard to secure the number of the wall surface sipes.

Figure 5:
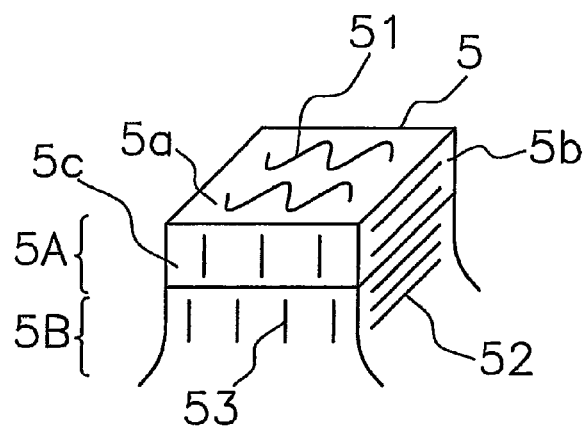
FIG. 5 is a perspective view of a block in another embodiment in accordance with the present invention.

FIG. 5 is a perspective view of a block in another embodiment in accordance with the present invention. The block 5 has a double-layer structure including an upper layer portion 5A arranged in an upper surface side, and a lower layer portion 5B made of a harder rubber than the upper layer portion 5A and arranged in a laminated manner in an inner side in the tire diametrical direction of the upper layer portion 5A. In the structure mentioned above, since the upper surface side of the block 5 is soft, it is easy to secure the ground contact area and it is possible to improve a traveling performance on the iced road surface, and since the root side of the block 5 is hard, it is possible to inhibit the block 5 from excessively collapsing and to secure the edge effect.

The block 5 is structured such that an upper surface sipe 51 corresponding to a waveform sipe is formed on the upper surface 5a, and wall surface sipes 52 and 53 are formed on the wall surfaces 5b and 5c. Two wall surface sipes 52 are formed in the upper layer portion 5A, three wall surface sipes 52 are formed in the lower layer portion 5B, and the number thereof is made more in the lower layer portion 5B than the upper layer portion 5A. Further, three wall surface sipes 53 are formed in the upper layer portion 5A, four wall surface sipes 53 are formed in the lower layer portion 5B, and the number thereof is made more in the lower layer portion 5B than the upper layer portion 5A. Accordingly, it is possible to make a rigidity balance between the upper layer portion 5A and the lower layer portion 5B favorable while lowering the ground contact pressure of the region close to the wall surfaces 5b and 5c, so that it is possible to enhance a uniformity of the ground contact pressure within the block 5.

A difference of a rubber hardness (a value obtained by measuring at a room temperature 23° C. in accordance with a durometer hardness test (type A) of JISK6253, the same is applied to the below) between the upper layer portion 5A and the lower layer portion 5B is exemplified by 45 to 55 degrees. Further, it is preferable that a boundary face between the upper layer portion 5A and the lower layer portion 5B is arranged in the center portion of the block 5, and it is specifically preferable that it is arranged at a depth position which is 45 to 55% of the depth of the main groove from the upper surface 5a.

Figure 6:
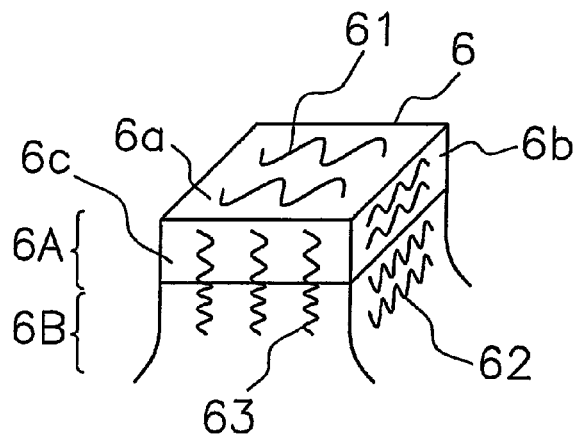
FIG. 6 is a perspective view of a block in another embodiment in accordance with the present invention.

FIG. 6 is a perspective view of a block in another embodiment in accordance with the present invention. The block 6 has a two-layer structure in which a hardness is differentiated between the upper layer portion 6A and the lower layer portion 6B, in the same manner as the block 5 mentioned above. The block 6 is structured such that an upper surface sipe 61 is formed in an upper surface 6a thereof, and a wall surface sipes 62 and 63 are formed in a wall surfaces 6b and 6c. The upper surface sipe 61 and the wall surface sipes 62 and 63 are all formed by the waveform sipe.

Two wall surface sipes 62 are formed in each of the upper layer portion 6A and the lower layer portion 6B, however, the wavelengths thereof are different, and the wave number is made more in the lower layer portion 6B than the upper layer portion 6A. Further, the wall surface sipe 63 is continuously provided from the upper layer portion 6A to the lower layer portion 6B, the wavelengths are differentiated between the upper layer portion 6A and the lower layer portion 6B, and the wave number is made more in the lower layer portion 6B than the upper layer portion 6A. Accordingly, it is possible to make a rigidity balance between the upper layer portion 6A and the lower layer portion 6B favorable while lowering the ground contact pressure of the region close to the wall surfaces 6b and 6c, so that it is possible to enhance a uniformity of the ground contact pressure within the block 6.

In the examples in FIGS. 5 and 6, there is shown the example in which the number and the wave number of the wall surface sipe are changed between the upper layer portion and the lower layer portion, however, in place thereof or in addition thereto, it is possible to make a sipe depth larger in the lower layer portion than the upper layer portion, whereby it is possible to improve the rigidity balance between the upper layer portion and the lower layer portion.

The tire as mentioned above can be manufactured in the same manner as the conventional tire manufacturing step only by modifying a metal mold for a vulcanization molding such that a blade for forming the wall surface sipe is installed to the metal mold. In other words, since an inner peripheral surface of the metal mold for the vulcanization molding is provided with a rib portion 7 for forming a main groove and a lateral groove as shown in FIG. 7, and the block is formed by a concave portion 8 provided between the rib portions 7, the wall surface sipe as mentioned above can be formed by installing a blade 9 to a side portion of the rib portion 7.

Figure 7:
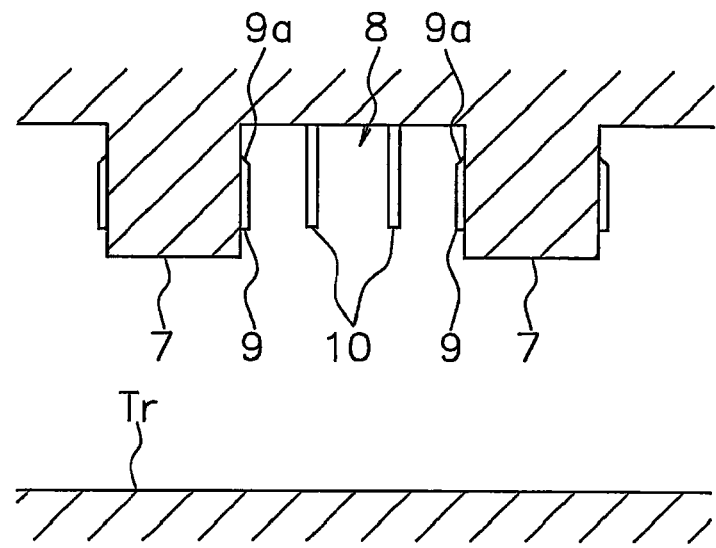
FIG. 7 is a cross sectional view of a substantial part of a metal mold for a vulcanization molding.
Figure 8:
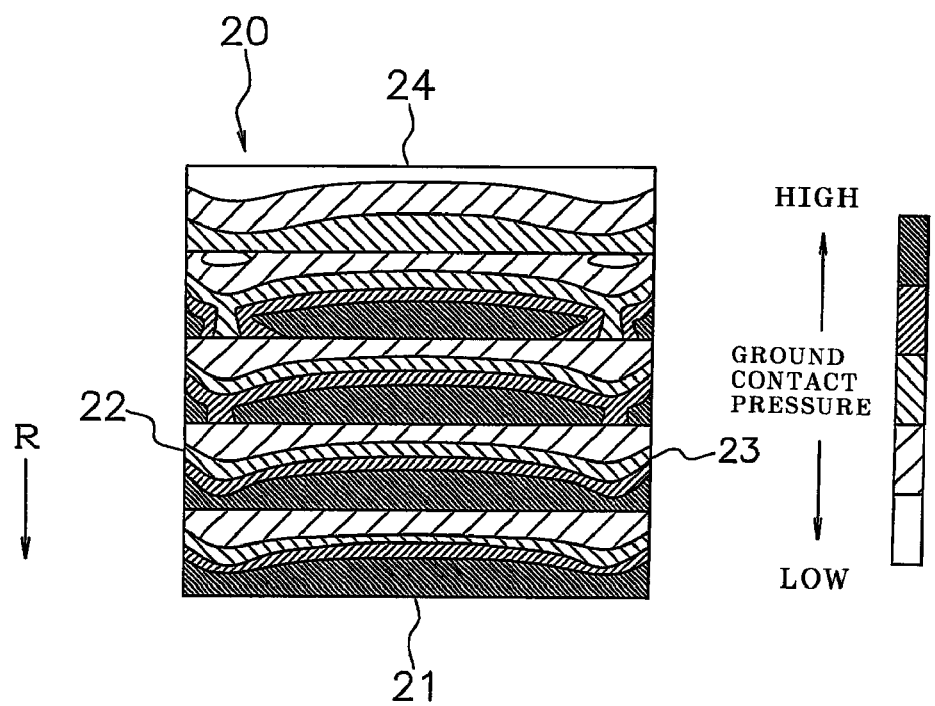
FIG. 8 is a conceptual view showing a ground contact pressure distribution within the block at a time of applying a braking force to the tire on an iced road surface.

FIG. 7 illustrates the blade 9 for forming the wall surface sipe extending in the tire diametrical direction, and a blade 10 for forming the upper surface sipe. At a time of the vulcanization molding, the rib portion 7 and the concave portion 8 are pressed against a tread surface Tr of an unvulcanized tire and a predetermined tread pattern is formed. At that time, various sipes are formed by the blades 9 and 10. An end portion 9a forming an outer side in a tire diametrical direction of the blade 9 is formed as a taper shape or a circular arc shape, and is structured such that the blade 9 easily gets out of the block at a time of a mold release after the vulcanization molding.

The pneumatic tire in accordance with the present invention is the same as a normal pneumatic tire except that the sipes as mentioned above are provided in a block, and the known material, shape, structure, manufacturing method and the like can be applied to the present invention.

The present invention can be also applied to a so-called summer tire, however, since the present invention is excellent in the traveling performance on the iced road surface, the present invention is particularly useful as a studless tire (winter tire).

[Other Embodiment]

(1) The tread pattern of the pneumatic tire in accordance with the present invention is not particularly limited. Accordingly, the shape of the block is not limited to the rectangular shape, but it is possible to apply to blocks having various shapes such as a polygonal shape, a V-form shape and the like. Further, in the embodiment mentioned above, there is shown the example in which the longitudinal direction of the upper surface sipe is parallel to the tire width direction, however, the present invention is not limited to this.

(2) In the present invention, the upper surface sipe may be constituted by an open sipe in which an end portion is open to the wall surface, however, it is preferable to employ a closed sipe in which at least one end is terminated, and it is more preferable to employ a both-side closed sipe as mentioned above. The reason is for securing the length of the wall surface sipe in the wall surface positioned in the longitudinal direction of the upper surface sipe and easily lowering the rigidity of the region close to the wall surface. In other words, in the case that the upper surface sipe is open to the wall surface, it is advantageous for preventing the local reduction of the block rigidity to arrange the wall surface sipe so as to avoid the upper surface sipe, however, if the upper surface sipe is constituted by the closed sipe, there is no restriction in the layout of the wall surface sipe, and it becomes useful to uniformize the ground contact pressure within the block.

EXAMPLE

To concretely show the structure and effect of the present invention, the ice braking performance was evaluated. The ice braking performance was evaluated based on a braking distance at a time of operating an ABS by applying a braking force at a speed of 40 km/h while traveling on an iced road surface. An evaluation is shown by an index number in the case of setting a comparative example 1 to 100, and indicates that the larger the numerical value is, the better the ice braking performance is.

Comparative Examples 1 to 3

In the tire having the tread pattern shown in FIG. 1, the tire in which the upper surface sipe is constituted by the waveform sipe and the wall surface sipe is not provided is set to a comparative example 1, the tire which is the same as the comparative example 1 except the structure in which the rib extending in parallel to the upper surface of the block is provided in the wall surface facing to the main groove is set to a comparative example 2, and the tire which is the same as the comparative example 1 except the structure in which the sipe extending in the tire diametrical direction is wholly provided in the wall surface around the block is set to a comparative example 3.

Examples 1 to 5

In the tire having the tread pattern shown in FIG. 1, the tire having the block structure shown in FIGS. 2 and 3 is set to an example 1, the tire having the block structure shown in FIG. 5 is set to an example 2, the tire in which two wall surface sipes 52 are formed in each of the upper layer portion 5A and the lower layer portion 5B in FIG. 5, and three wall surface sipes 53 are formed therein is set to an example 3, the tire having the block structure shown in FIG. 6 is set to an example 4, and the tire in which the wave number of the wall surface sipes 62 and 63 in the lower layer portion 6B in FIG. 6 is set to the same as the upper layer portion 6A is set to an example 5.

In the comparative examples 1 to 3, and the example 1, the rubber hardness of the block is set to 45 degrees. In the examples 2 to 5, the rubber hardness of the upper layer portion of the block is set to 45 degrees, and the rubber hardness of the lower layer portion is set to 55 degrees. Further, the tire size is set to 225/45R17 in all of them. Results of the evaluation are shown in Table 1.

TABLE 1

| | Comparative Example 1 | Comparative Example 2 | Comparative Example 3 | Example 1 | Example 2 | Example 3 | Example 4 | Example 5 |
|---|---|---|---|---|---|---|---|---|
| Ice braking Performance | 100 | 101 | 102 | 102 | 104 | 103 | 105 | 104 |

As shown in Table 1, in the examples 1 to 5, the ice braking performance is improved in comparison with the comparative examples 1 to 3. It is considered that this is because the ground contact pressure within the block can be uniformized by lowering the rigidity of the region near the wall surface by forming the wall surface sipe as mentioned above. Further, in the examples 2 and 4, the ice braking performance is improved in comparison with the examples 3 and 5, and there can be considered that the rigidity balance is improved between the upper layer portion and the lower layer portion of the block.

What is claimed is:

1. A pneumatic tire provided with a block in a tread surface, comprising:
   an upper surface sipe formed on an upper surface of the block;
   a first wall surface sipe formed in a first wall surface of the block and extending in a direction intersecting the upper surface sipe; and
   a second wall surface sipe formed in a second wall surface which is adjacent to the first wall surface, and extending in a direction intersecting the upper surface sipe and the first wall surface sipe,
   wherein the block is provided with an upper layer portion arranged in an upper surface side, and a lower layer portion made of a harder rubber than the upper layer portion and arranged in an inner side in the tire diametrical direction of the upper layer portion, and
   wherein the number of at least one of the first wall surface sipe and the second wall surface sipe is made more in the lower layer portion than the upper layer portion.

2. The pneumatic tire according to claim 1, wherein the first wall surface sipe and the second wall surface sipe are terminated within the wall surface without being open to a ridge line of the block.

3. The pneumatic tire according to claim 1, wherein the upper surface sipe is constituted by a closed sipe.

4. A pneumatic tire provided with a block in a tread surface, comprising:
   an upper surface sipe formed on an upper surface of the block;
   a first wall surface sipe formed in a first wall surface of the block and extending in a direction intersecting the upper surface sipe; and
   a second wall surface sipe formed in a second wall surface which is adjacent to the first wall surface, and extending in a direction intersecting the upper surface sipe and the first wall surface sipe,
   wherein the block is provided with an upper layer portion arranged in an upper surface side, and a lower layer portion made of a harder rubber than the upper layer portion and arranged in an inner side in the tire diametrical direction of the upper layer portion, and
   wherein at least one of the first wall surface sipe and the second wall surface sipe is formed by a waveform sipe and the wave number of the wall surface sipe is set more in the lower layer portion than the upper layer portion.

5. The pneumatic tire according to claim 4, wherein the first wall surface sipe and the second wall surface sipe are terminated within the wall surface without being open to a ridge line of the block.

6. The pneumatic tire according to claim 4, wherein the upper surface sipe is constituted by a closed sipe.

* * * * *